(12) United States Patent
Wu

(10) Patent No.: US 6,971,774 B2
(45) Date of Patent: Dec. 6, 2005

(54) INSERTION STRUCTURE FOR INSERTING LAMP ROD TO WIRE WINDING BOX

(76) Inventor: Wen-Chang Wu, 235 Chung-Ho Box 8-24, Taipei (TW)

(*) Notice: Subject to any disclaimer, the term of this patent is extended or adjusted under 35 U.S.C. 154(b) by 180 days.

(21) Appl. No.: 10/628,797

(22) Filed: Jul. 29, 2003

(65) Prior Publication Data

US 2005/0024883 A1 Feb. 3, 2005

(51) Int. Cl.[7] ................................. F21S 8/00
(52) U.S. Cl. ............... 362/430; 362/429; 362/405; 362/439; 362/406; 362/457; 439/902; 439/551
(58) Field of Search .................. 362/430, 429, 362/405, 439, 404, 406, 457; 439/902, 551, 439/550, 598, 599, 683, 351, 537, 356

(56) References Cited

U.S. PATENT DOCUMENTS 5,934,792 A * 8/1999 Camarota ................. 362/249

* cited by examiner

Primary Examiner—Sandra O'Shea
Assistant Examiner—Bertrand Zeade

(57) ABSTRACT

An insertion structure for inserting a lamp rod to a wire winding box comprises a lamp seat and an inserting head. The retaining seat has a flange and a lateral side of the flange is a threaded surface. The threaded surface passes through the via hole of the wire winding box. A hollow slot is formed on threaded surface of the retaining seat. A lateral side of the slot is locked with a reed. An inner side of the reed is punched with an embedded block. The embedded block protruding into the slot of the retaining seat. An interior of the insertion head is fixed with a conductive plug. A lateral side of the insertion head has a bank of teeth for buckling the retaining seat. Thereby, a lamp rod with the insertion structure is detachable from the wire winding box easily for storage and transfer.

2 Claims, 5 Drawing Sheets

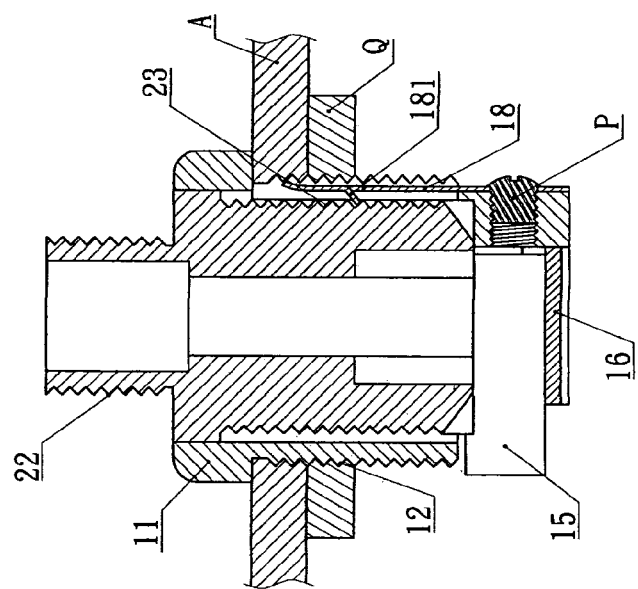
Fig. 3-A
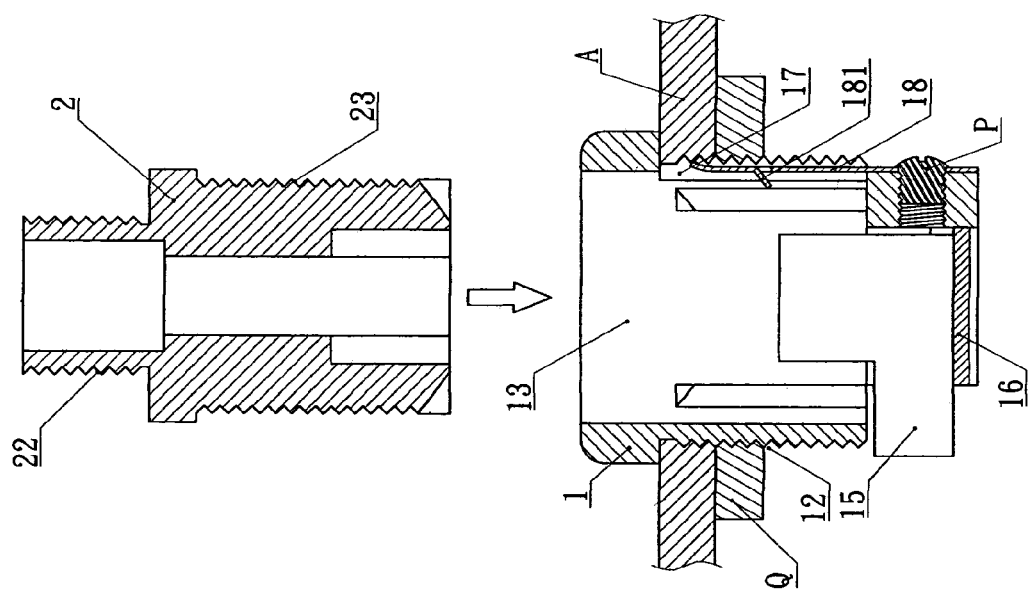
Fig. 3-B

US 6,971,774 B2

INSERTION STRUCTURE FOR INSERTING LAMP ROD TO WIRE WINDING BOX

BACKGROUND OF THE INVENTION

The present invention relates to lamp assembly devices, and particularly to a locking device for locking a lamp rod. By the design of the present invention, a user can assembled the lamp rod by inserting it into the lamp seat easily. Thus, the lamp is detachable for storage and transfer with a smaller volume.

The prior art buckling structures of lamps, such as wall lamps, seat lamps, or stand lamps, are assembled by screwing studs with nuts. Not only a collision easy occurs, but also the locking tools (for example, spanners, openers, etc.) are needed. In assembly, the wires will be exposed which might generate electric shock. Moreover, the assembly work is tedious and thus it is unsuitable for being assembled by the users themselves. Thus generally, the wire winding box is assembled with the inserting rod before sale. Thereby, the cost is high and a larger space is necessary for transfer and storage.

SUMMARY OF THE INVENTION

Accordingly, the primary object of the present invention is to provide an insertion structure for inserting a lamp rod into a wire winding box which has a retaining seat; a front end of the retaining seat having a flange and a lateral side of the flange being a threaded surface; the threaded surface passing through the via hole of the wire winding box and being locked by a nut; a hollow slot being formed on the threaded surface of the retaining seat; a lateral side of the slot being locked with a reed by a stud; an inner side of the reed being punched with an embedded block inclined to the slot; the embedded block protruding into the slot of the retaining seat; a insertion head; an interior of the insertion head being fixed with a conductive plug; the conductive plug protruding from a bottom side of the insertion bead for conducting to the receptacle in the retaining seat; a lateral side of the insertion head corresponding to the reed of the retaining seat having a bank of teeth for buckling the retaining seat as the insertion head is inserted into the retaining seat.

A further object of the present invention is to provide an insertion structure, wherein in packing, transferring, or storage, the lamp rod can be detached from the wire winding box for reducing volume. If it is desired to use the lamp, the user only needs to assemble the lamp rod in the wire winding box without using any locking tool.

The various objects and advantages of the present invention will be more readily understood from the following detailed description when read in conjunction with the appended drawing.

BRIEF DESCRIPTION OF THE DRAWINGS

FIG. 3A is a plane cross section view showing a view before the lamp rod is inserted.

FIG. 3B is a plane cross section view showing the insertion of lamp rod of the present invention.

BRIEF DESCRIPTION OF THE PREFERRED EMBODIMENTS

Figure 1:
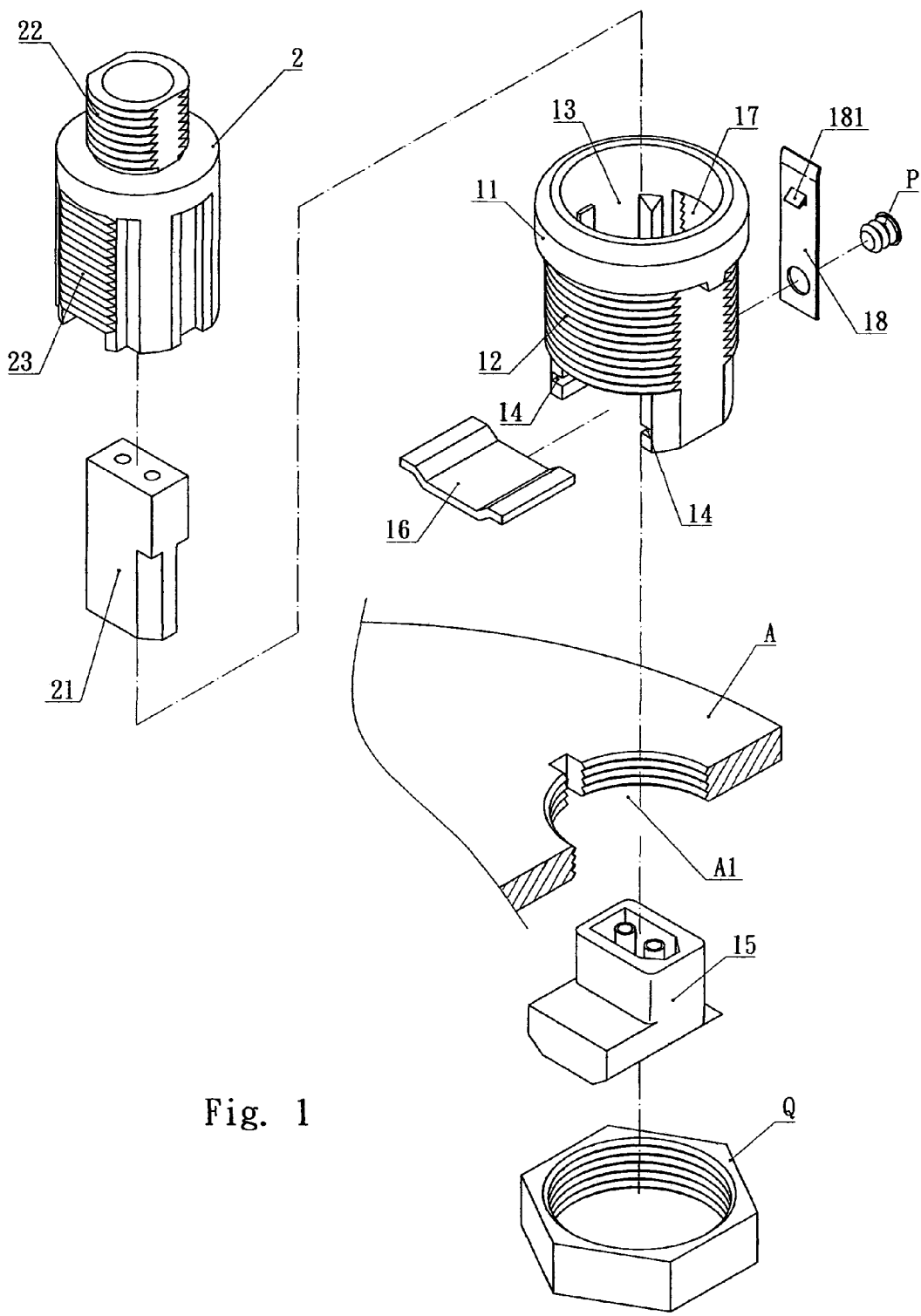
FIG. 1 is an exploded perspective view of the present invention.
Figure 2:
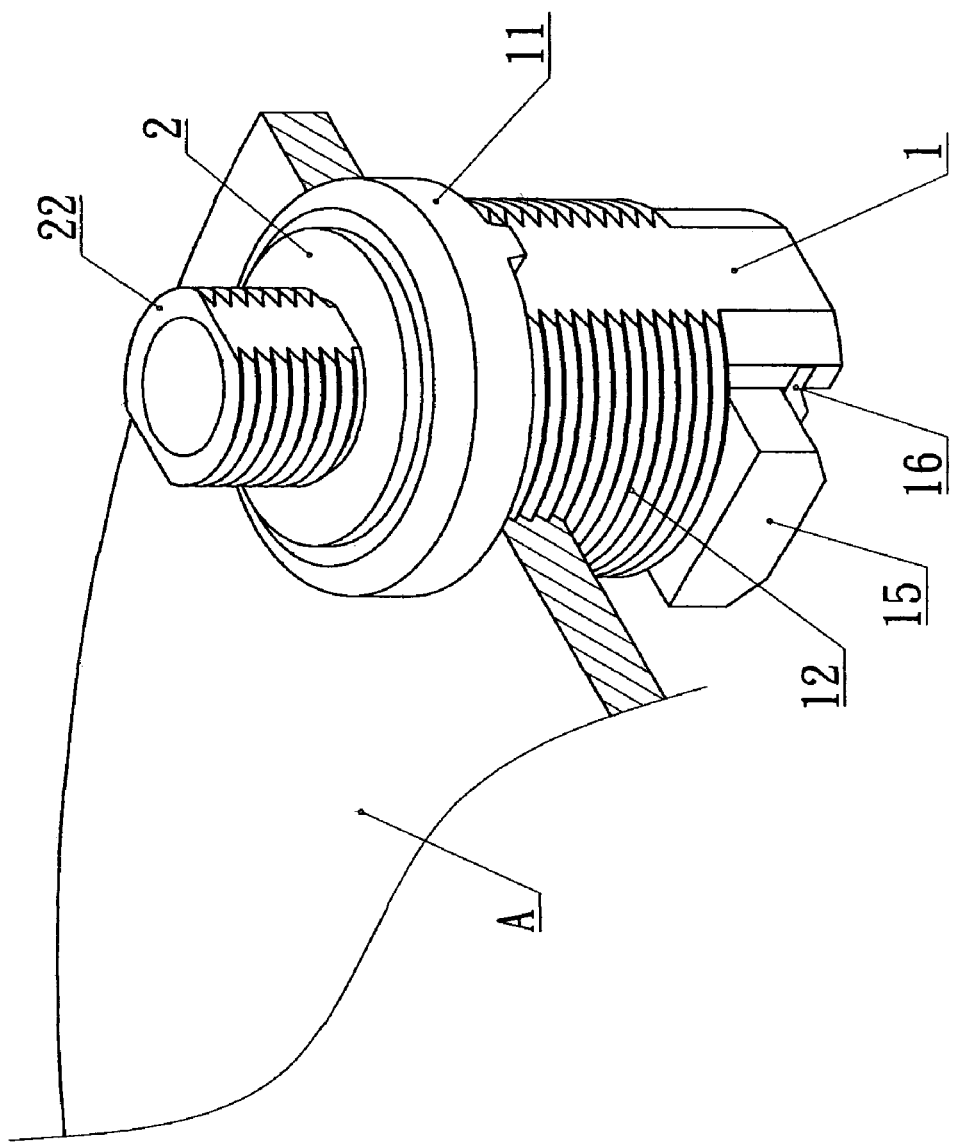
FIG. 2 is an assembled perspective view of the present invention.

Referring to FIGS. 1 and 3, the structure and configuration of the present invention can be clearly shown. The present invention is formed by a retaining seat 1 inserted into a via hole of a wire winding box A and an insertion head 2 inserted in the retaining seat 1.

A front end of the retaining seat 1 has a flange 11 and a lateral side of the flange 11 is a threaded surface 12. The threaded surface 12 passes through the via hole A1 of the wire winding box A and is locked by a nut Q. A lower end of the retaining seat 1 has an inserting groove 13. Two inner sides of the inserting groove 13 have respective embedding grooves 14. A receptacle 15 is installed in the inserting groove 13 and then a gate plate 16 is inserted into the two embedding grooves 14. The receptacle 15 is installed in the inserting groove 13 in advance and then the gate plate 16 is inserted into the embedding grooves 14 for positioning the receptacle 15 within the retaining seat 1. A hollow slot 17 is formed on the threaded surface 12 of the retaining seat 1. A lateral side of the slot 17 is locked with a reed 18 by a stud P. An inner side of the reed 18 is punched with an embedded block 181 inclined to the slot 17. The embedded block 181 protrudes into the slot 17 of the retaining seat 1 for retaining the insertion head 2.

The insertion head 2 is at one end portion of a lamp rod. An interior of the insertion head 2 is fixed with a conductive plug 21. The conductive plug 21 protrudes from a bottom side of the insertion head 2 for conducting to the receptacle 15 in the retaining seat 1. A top surface of the insertion head 2 has a threaded section 22 for locking the lamp rod. A lateral side of the insertion head 2 corresponding to the reed 18 of the retaining seat 1 has a bank of teeth 23 for buckling the retaining seat 1 as the insertion head 2 is inserted into the retaining seat 1.

Referring to FIG. 3A to 3C, the conduction of the lamp rod and wire winding box A will be described here. One end of the insertion head 2 is inserted into the inserting groove 13 of the retaining seat 1 so that the teeth 23 of the insertion head 2 are buckled to the reed 18 gradually. When the conductive plug 21 aligning to the stud P is inserted into the insertion head 2, the insertion head 2 and the retaining seat 1 are fixed.

Figure 4:
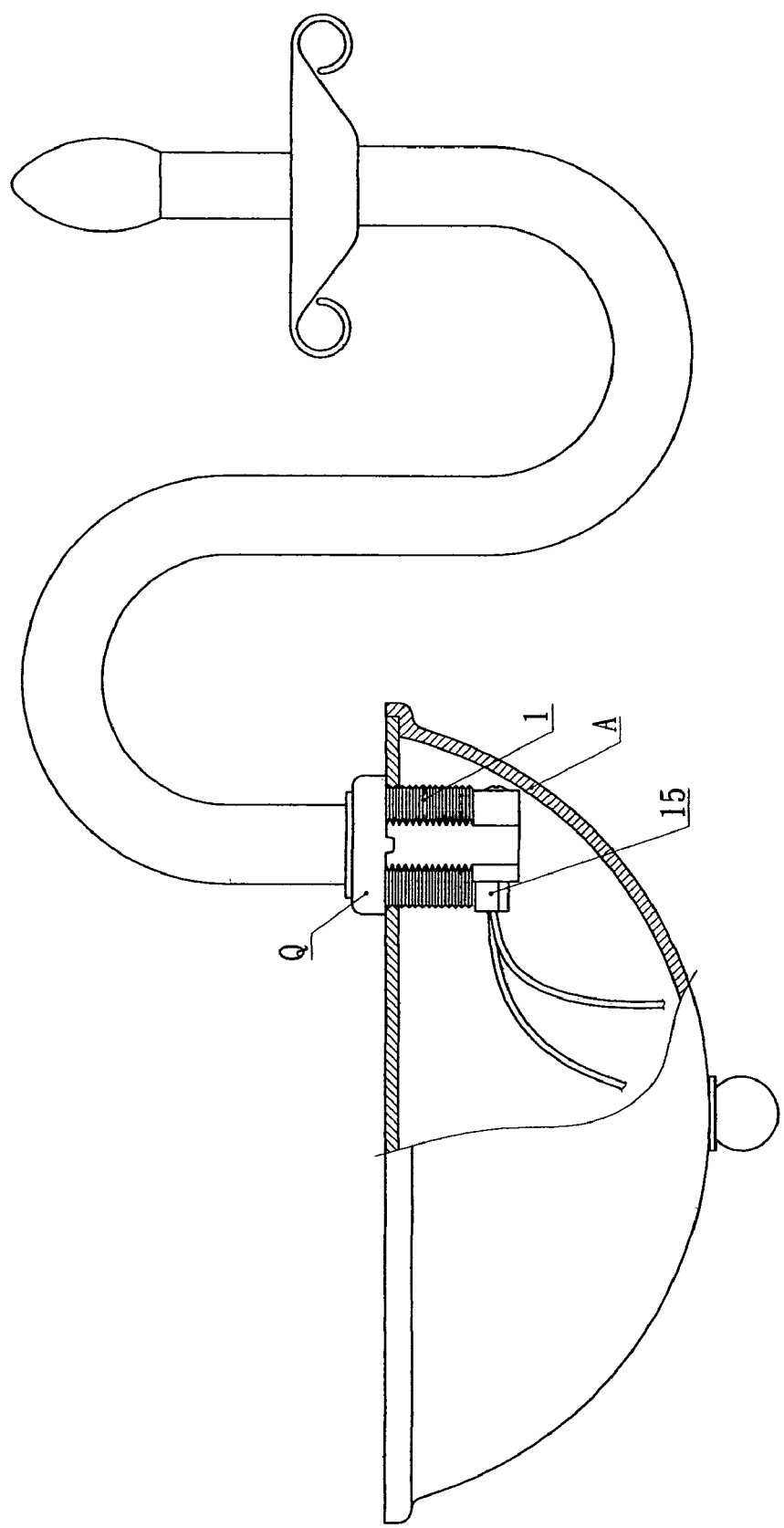
FIGS. 4 and 5 shows the applications of the present invention.
Figure 5:
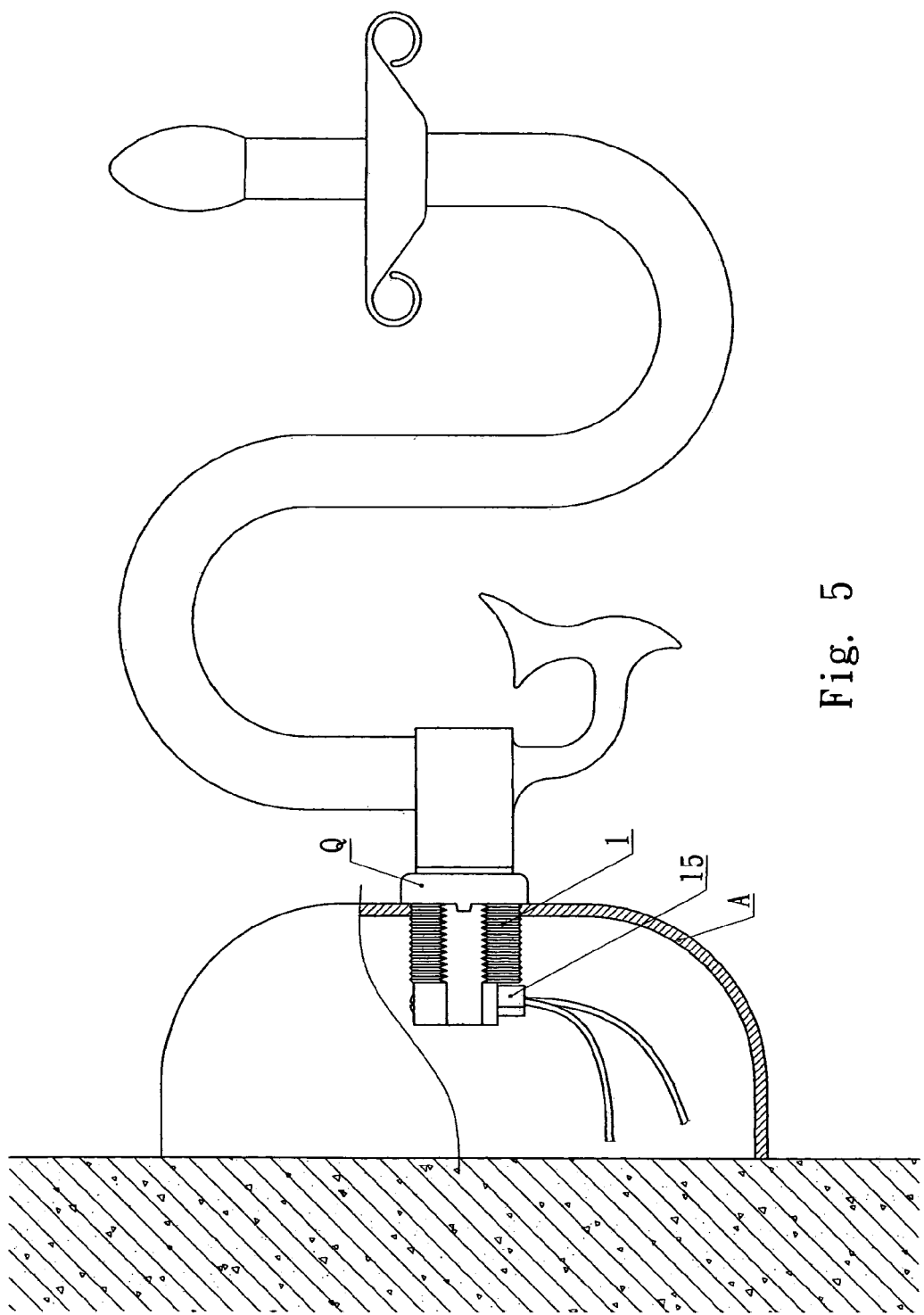

Referring to FIGS. 4 and 5, the application of the present invention which is assembled to a wall lamp and a ceiling lamp is illustrated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An insertion structure for inserting a lamp rod to a wire winding box comprising:

a retaining seat; a front end of the retaining seat having a flange and a lateral side of the flange being a threaded surface; the threaded surface passing through a via hole of the wire winding box and being locked by a nut; a hollow slot being formed on the threaded surface of the retaining seat; a lateral side of the slot being locked with a reed by a stud; an inner side of the reed being punched with an embedded block inclined to the slot; the embedded block protruding into the slot of the retaining seat;

an insertion head; an interior of the insertion head being fixed with a conductive plug; the conductive plug protruding from a bottom side of the insertion head for conducting to a receptacle in the retaining seat; a lateral side of the insertion head corresponding to the reed of the retaining seat having a bank of teeth for buckling the retaining seat as the insertion head is inserted into the retaining seat;

thereby, a lamp rod with the insertion structure is detachable from the wire winding box easily for storage and transfer.

2. The insertion structure as claimed in claim 1, wherein one end of the retaining seat having an inserting groove; two inner sides of the inserting groove have respective embedding grooves; a receptacle is installed in the inserting groove and then a gate plate is inserted into the two embedding grooves for positioning the receptacle within the retaining seat.

* * * * *